(No Model.)
T. A. GILLESPIE.
PIPE JOINT.
No. 418,007. Patented Dec. 24, 1889.
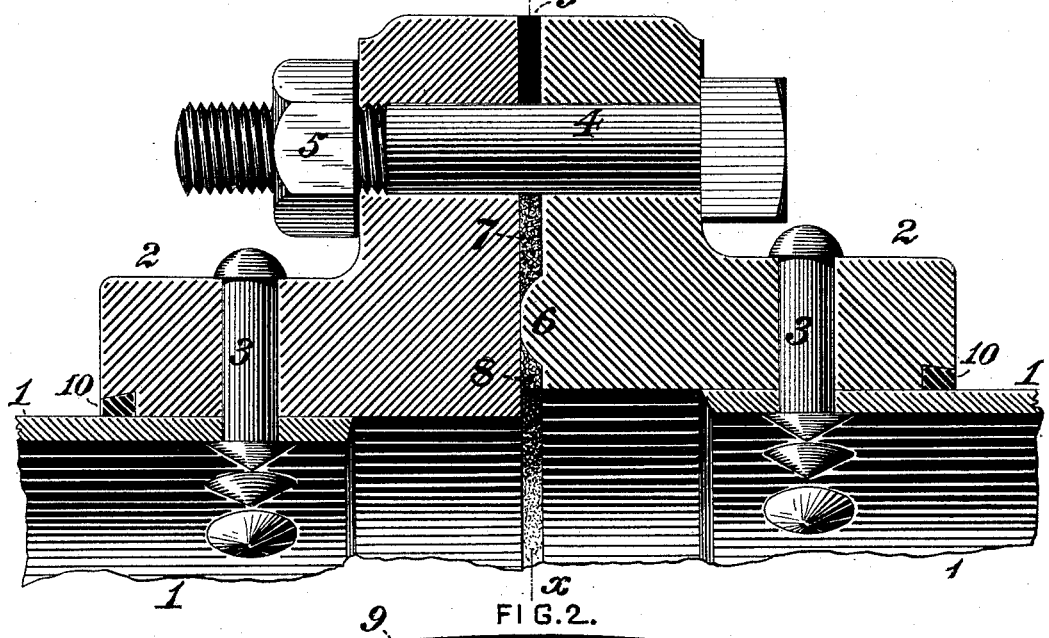
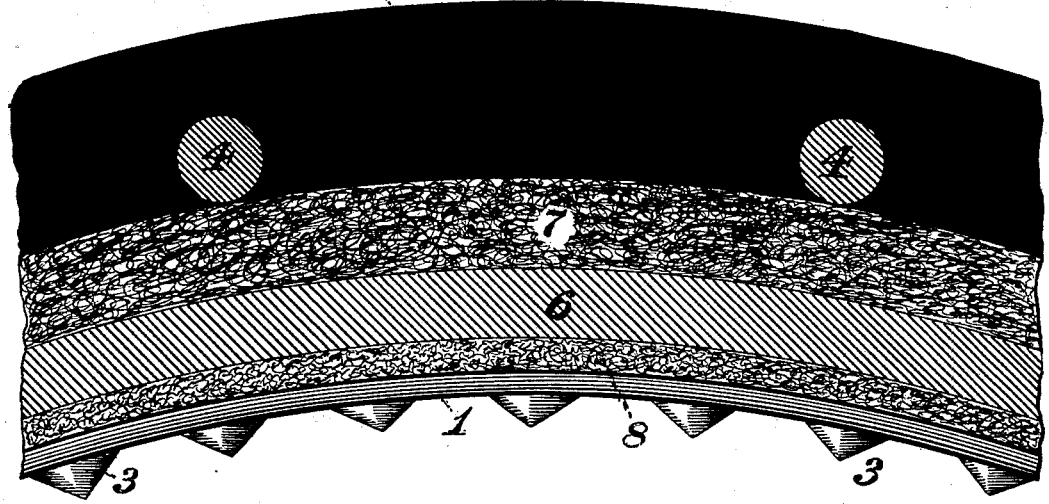
WITNESSES:
J. Snowden Bell.
F. E. Gaither.
INVENTOR,
Thos. A. Gillespie,
by George H. Christy
Att'y

UNITED STATES PATENT OFFICE.

THOMAS A. GILLESPIE, OF PITTSBURG, PENNSYLVANIA.

PIPE-JOINT.

SPECIFICATION forming part of Letters Patent No. 418,007, dated December 24, 1889.

Application filed November 2, 1889. Serial No. 328,987. (No model.)

*To all whom it may concern:*

Be it known that I, THOMAS A. GILLESPIE, a citizen of the United States, residing at Pittsburg, in the county of Allegheny and State of Pennsylvania, have invented or discovered a certain new and useful Improvement in Pipe-Joints, of which improvement the following is a specification.

My invention relates to joints for gas and water mains or pipes, and more particularly to those of wrought-metal pipes of comparatively large diameter which are employed for the conveyance of natural gas.

The object of my invention is to provide a joint of the flange type which can be readily and inexpensively made, and which will effectually prevent leakage and insure a firm and unyielding connection of the pipe-sections.

To this end my invention, generally stated, consists in the combination of two pipe-sections provided with end flanges abutting by an annular bearing, a series of clamping-bolts connecting the flanges exterior to their contact-surfaces, a packing-ring compressed between the flanges by the clamping-bolts exterior to the annular bearing, and a packing-ring fitted between the flanges on the inside of the annular bearing. The improvement claimed is hereinafter fully set forth.

In the accompanying drawings, Figure 1 is a longitudinal section through a pipe-joint embodying my invention, and Fig. 2 a transverse section through the same at the line *x x* of Fig. 1.

My invention is herein shown as applied on a gas-main, the pipe-sections 1 1 of which are composed of riveted steel plates and are of large diameter, that of the smaller and larger rings, respectively, being in practice thirty-six and thirty-six and one-half inches inside. A cast-iron flange 2 is secured by rivets 3 to each end of the pipe-sections 1, said flanges being connected by a circumferential series of clamping-bolts 4, provided with proper nuts 5. An annular bearing 6 is formed upon the face of one of the flanges 2 between the bolt holes and the bore of the flange, said bearing abutting when the flanges are connected by the bolts against a truly-faced surface on the corresponding portion of the flange of the adjacent pipe-section.

A ring or gasket 7, of asbestus or other suitable packing, is inserted in the space between the faces of the flanges 2 exterior to the annular bearing 6 and between the same and the series of connecting-bolts 4, and is compressed tightly therein when the nuts 5 are screwed up to their proper bearing. The space between the faces of the flanges on the inner side of the bearing 6 is then filled up with a packing-ring 8, which is driven in tightly by a calking-tool, the application of which can be effectively made by reason of the large diameter of the pipe. The remainder of the space between the faces of the flanges, being that exterior to the outer packing-ring 7, is by preference filled with a semiliquid or plastic composition of such character as to set or become hard after application, and thereby to serve as a supplement to the packing-rings in preventing leakage from the joint. A material which is suitable and desirable for the purpose is set forth in Letters Patent No. 356,411, granted to T. McSweeney January 18, 1887, but any other preferred composition may be equivalently employed. The joints between the flanges and pipe-sections are made tight by lead packing 10, which is fitted into and calked in undercut or dovetail recesses in the flanges on their outer sides.

It will be obvious that my improvement is equally applicable in cases where the flanges are formed integral with the pipe-sections, and its employment in nowise interferes with or modifies the usual method of connection of the sections or involves the use of any additional or extraneous members in the construction of the pipe-sections and their connections.

I claim as my invention and desire to secure by Letters Patent—

1. The combination of two pipe-sections provided with end flanges, an annular bearing fixed on one of said flanges and abutting against the other, a series of bolts connecting the flanges exterior to their contact-surfaces, a packing-ring compressed between the flanges exterior to the annular bearing, and a packing-ring fitted between the flanges on the inner side of the annular bearing, substantially as set forth.

2. The combination of two pipe-sections provided with end flanges, an annular bearing fixed on one of said flanges and abutting against the other, a series of bolts connecting the flanges exterior to their contact-surfaces, packing-rings compressed between the flanges on the inner and outer sides of the annular bearing, and a filling of semi-liquid or plastic material inserted between the flanges exterior to the outer packing-ring, substantially as set forth.

In testimony whereof I have hereunto set my hand.

THOMAS A. GILLESPIE.

Witnesses:
J. SNOWDEN BELL,
R. H. WHITTLESEY.